B. J. NOYES.
PULP SEPARATOR.
APPLICATION FILED JUNE 14, 1907.

916,481.

Patented Mar. 30, 1909.

Witnesses:
H. B. Davis.
Cynthia Doyle.

Inventor:
Bernice J. Noyes
By Hayes & Harriman,
Attys

UNITED STATES PATENT OFFICE.

BERNICE J. NOYES, OF BOSTON, MASSACHUSETTS, ASSIGNOR TO THAXTER N. TRIPP, TRUSTEE, OF LYNN, MASSACHUSETTS.

PULP-SEPARATOR.

No. 916,481.        Specification of Letters Patent.        Patented March 30, 1909.

Application filed June 14, 1907. Serial No. 379,032.

*To all whom it may concern:*

Be it known that I, BERNICE J. NOYES, of Boston, county of Suffolk, State of Massachusetts, have invented an Improvement in Pulp-Separators, of which the following description, in connection with the accompanying drawings, is a specification, like characters on the drawings representing like parts.

This invention relates to pulp separators, especially adapted for separating the fibers and other paper forming ingredients from the milk water of a paper-making machine.

The invention has for its object to construct a rotary separator of large capacity, but of small dimensions, which requires but little power to operate it; also, to provide means for drawing the water from the interior of the revolving separator, and, if desired, to produce a partial vacuum therein; also, to provide new and improved means for removing the fibers and other particles from the surface of the separator.

Figure 1:
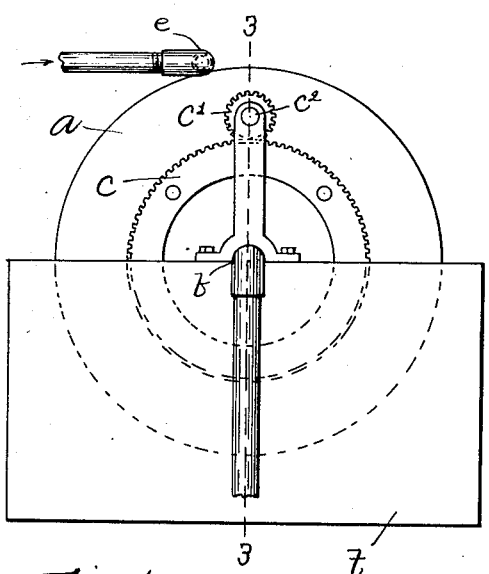
Figure 2:
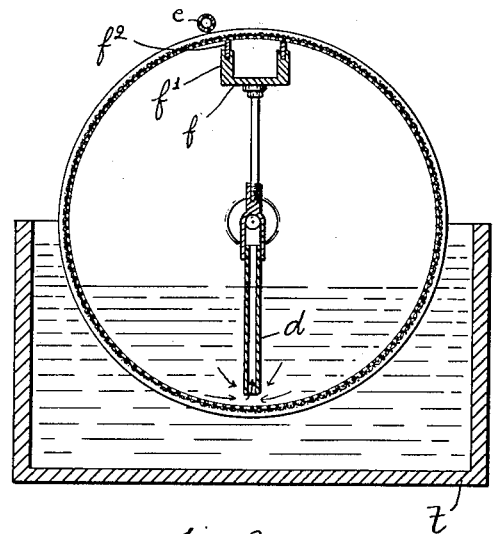
Figure 3:
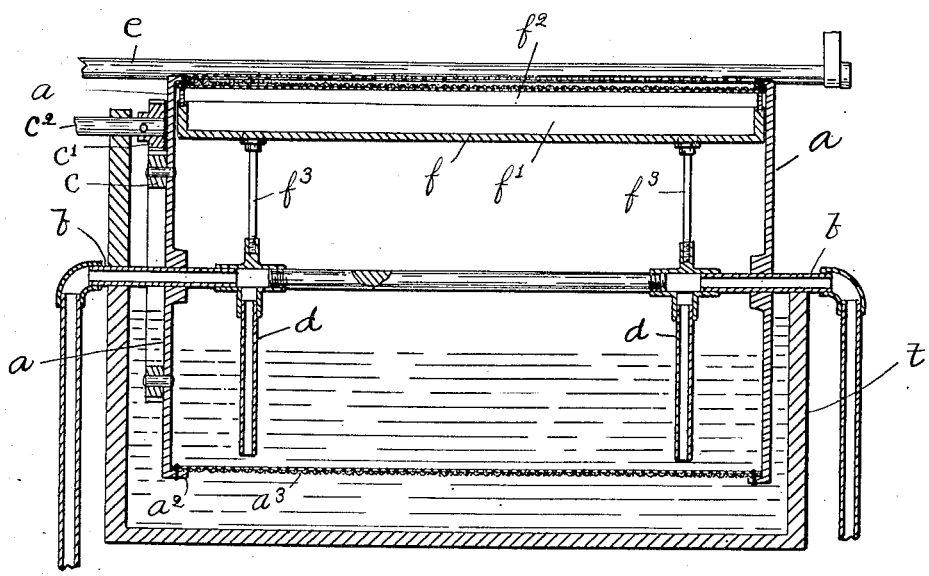

Figure 1 shows an end view of a pulp separator embodying this invention. Fig. 2 is a transverse vertical section of the pulp separator shown in Fig. 1. Fig. 3 is a longitudinal vertical section of the pulp separator shown in Fig. 1, taken on the dotted line 3—3.

The pulp separator comprises essentially a revoluble cylindrical screen, composed of circular ends or heads $a$, $a'$, of any suitable diameter, having flanges $a^2$ to which the edges of a screen $a^3$ are secured. As a screen I prefer to employ a wire cloth of fine mesh, upon which is laid a piece of textile material, such for instance as silk or felt. The screen wire, if made substantial, gives a certain amount of rigidity to the cylinder and holds the textile material against inward movement when a partial vacuum is formed in the cylinder. The cylindrical screen is arranged horizontally in a tank $t$, to which the milk water or other liquid to be separated is conveyed; and is mounted to revolve upon a stationary horizontal shaft $b$. For the purpose of revolving the cylindrical screen a toothed ring $c$ may be secured to one end or head which is engaged by a pinion $c'$, secured to a positively driven shaft $c^2$, or any other suitable means may be employed for rotating it. The cylindrical screen is adapted to be partially submerged in the milk water which is contained in the tank, and the water passes through the screen, thereby entering the space within it, while the fibers and other particles collect upon the outside thereof.

For the purpose of drawing the water from the interior of the screen, and also, if desired, for producing a partial vacuum therein to assist in drawing the water through the screen and for collecting the fibers and other particles thereon, pipes $d$, one or more, are arranged in the screen, which extend downwardly, radially from the stationary shaft upon which the screen is mounted, and said pipes are connected with the stationary shaft, and said shaft is made hollow at each end to provide passages therethrough, communicating with the downwardly extended pipes. The hollow support thus constructed, at one or both ends, will be connected with a suction pump or equivalent device, not shown, by means of which the water will be drawn from the screen, and, if desired, a partial vacuum produced.

The screen is revolved slowly, and the fibers and other particles collect on its exposed surface, and for the purpose of removing them, a pipe $e$ extends lengthwise the screen, at the top of its exposed portion, having orifices arranged along one side of it, or it may be a very narrow slit, and said pipe is adapted to be connected to an air pressure device, not shown, whereby jets of air are caused to forcibly issue from the orifices in the pipe. The pipe $e$ is so arranged that the jets of air issuing from the orifice thereof, pass directly across the top of the exposed portion of the screen, in a tangential direction, and act to blow off the fibers and other particles which will have been collected thereon.

In case the partial vacuum which is formed in the cylindrical screen should be sufficient to hold the fibers and other particles on the surface of the screen with considerable force, means may be provided for eliminating the vacuum at the top of the exposed portion of the screen, where the jets of air strike it. To accomplish this result a long narrow chamber is formed on the inside of the screen, at the top of the exposed portion, which extends lengthwise and from end to end of the screen. This chamber may be composed of a plate $f$ having upturned sides and ends $f'$, which are extended by strips of rubber $f^2$, and the latter are adapted to engage the interior of the screen wire. A substantially tight chamber is thus produced. The plate $f$ is stationarily supported by arms $f^3$ connected to the central support of the cylindrical screen, or it may be otherwise supported.

The apparatus herein shown may be put to various uses.

Having thus described my invention, what I claim as new and desire to secure by Letters Patent is:—

1. In a pulp separator, a revoluble cylindrical screen adapted to be partially submerged in the liquid, means for drawing liquid from the interior of the screen, and means for ejecting jets of air across the top of the exposed portion of the screen, to remove the fibers and other particles therefrom, substantially as described.

2. In a pulp separator, a revoluble cylindrical screen adapted to be partially submerged in the liquid, means for revolving it, means for drawing liquid from the interior of the screen and also for producing a partial vacuum therein and means for ejecting jets of air across the top of the exposed portion of the screen, to remove therefrom the fibers and other particles, substantially as described.

3. In a pulp separator, a revoluble cylindrical screen adapted to be partially submerged in the liquid, means for revolving it, means for drawing liquid from the interior of the screen and also for producing a partial vacuum therein, means for ejecting jets of air across the top of the exposed portion of the screen, to remove therefrom the fibers and other particles, and means for eliminating the vacuum at that part of the screen over which the jets of air pass, substantially as described.

4. In a pulp separator, a revoluble cylindrical screen adapted to be partially submerged in the liquid, means for revolving it, means for drawing liquid from the interior of the screen and also for producing a partial vacuum therein, means for ejecting jets of air across the top of the exposed portion of the screen, to remove therefrom the fibers and other particles, and a stationary chamber contained within and extended lengthwise the screen, disposed contiguous that portion of the exposed portion thereof which is engaged by the jets of air, to prevent the formation of a partial vacuum thereat, substantially as described.

5. In a pulp separator, a revoluble cylindrical screen adapted to be partially submerged in the liquid, means for revolving it, means for drawing liquid from its interior and for producing a partial vacuum therein, means for removing the fibers and other particles from the exposed portion of the screen, a stationary chamber contained in and extended lengthwise the screen, disposed contiguous that portion of its exposed portion over which the fibers and other particles are being moved to prevent the formation of a partial vacuum thereat, substantially as described.

In testimony whereof, I have signed my name to this specification, in the presence of two subscribing witnesses.

BERNICE J. NOYES.

Witnesses:
   H. B. DAVIS,
   CYNTHIA DOYLE.